United States Patent [19]
Erikson

[11] Patent Number: 5,820,889
[45] Date of Patent: Oct. 13, 1998

[54] GAS NOZZLE FOR A GAS ASSISTED INJECTION MOLDING SYSTEM

[75] Inventor: Jon R. Erikson, Rochester Hills, Mich.

[73] Assignee: Elizabeth Erikson Trust, Rochester Hills, Mich.

[21] Appl. No.: 589,494

[22] Filed: Jan. 22, 1996

[51] Int. Cl.⁶ .................................................. B29C 45/03
[52] U.S. Cl. ......................... 425/130; 425/542; 425/569; 425/566; 264/85; 264/572
[58] Field of Search ..................................... 425/130, 573, 425/145, 149, 564, 566; 264/85, 572

[56] References Cited

U.S. PATENT DOCUMENTS

| | | |
|---|---|---|
| 2,331,688 | 10/1943 | Hobson . |
| 2,345,144 | 3/1944 | Opavsky et al. . |
| 3,021,559 | 2/1962 | Strong . |
| 3,135,640 | 6/1964 | Kepka et al. . |
| 4,033,710 | 7/1977 | Hanning . |
| 4,106,887 | 8/1978 | Yasuike et al. . |
| 4,120,924 | 10/1978 | Rainville . |
| 4,129,635 | 12/1978 | Yasuike et al. . |
| 4,136,220 | 1/1979 | Olabisi . |
| 4,474,717 | 10/1984 | Hendry . |
| 4,488,863 | 12/1984 | Collette . |
| 4,555,225 | 11/1985 | Hendry . |
| 4,740,150 | 4/1988 | Sayer . |
| 4,824,732 | 4/1989 | Hendry et al. . |
| 4,935,191 | 6/1990 | Baxi . |
| 5,044,924 | 9/1991 | Loren . |
| 5,047,183 | 9/1991 | Eckardt et al. . |
| 5,127,814 | 7/1992 | Johnson et al. . |
| 5,173,241 | 12/1992 | Shibuya et al. . |
| 5,198,177 | 3/1993 | Sugiyama et al. . |
| 5,198,238 | 3/1993 | Baxi ......................................... 425/130 |
| 5,232,654 | 8/1993 | Aida et al. ............................... 264/572 |
| 5,232,711 | 8/1993 | Hendry . |
| 5,284,429 | 2/1994 | Schneider et al. . |
| 5,295,800 | 3/1994 | Nelson et al. ........................... 264/572 |
| 5,464,342 | 11/1995 | Marik et al. ............................. 269/572 |
| 5,482,669 | 1/1996 | Shah ........................................ 425/130 |

FOREIGN PATENT DOCUMENTS

| | | |
|---|---|---|
| 2106546 | 2/1971 | Germany . |
| 1076047 | 7/1967 | United Kingdom . |

OTHER PUBLICATIONS

Structural Foam: Where It's Headed, Michael Colangelo, Plastics Technology, Jun. 1983, pp. 41–46.

*Primary Examiner*—Jay H. Woo
*Assistant Examiner*—Iurie A. Schwartz
*Attorney, Agent, or Firm*—Bliss McGlynn P.C.

[57] ABSTRACT

A gas nozzle for a gas assisted injection molding system includes a body having an inlet in fluid communication with a source of pressurized gas, an outlet through which the gas leaves the nozzle and a passage extending between the inlet and the outlet. The outlet includes a plurality of apertures arranged in a predetermined manner relative to one another such that the flow path through the outlet approximates a ⅛ inch hole but does not clog with resin over successive plastic injections into the mold.

40 Claims, 4 Drawing Sheets

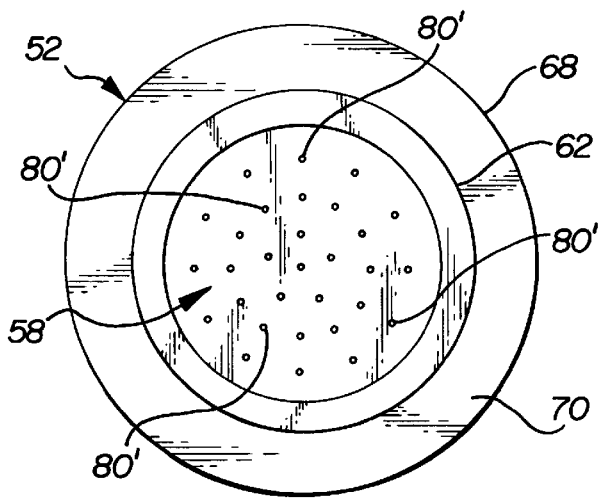
FIG-8
FIG-9
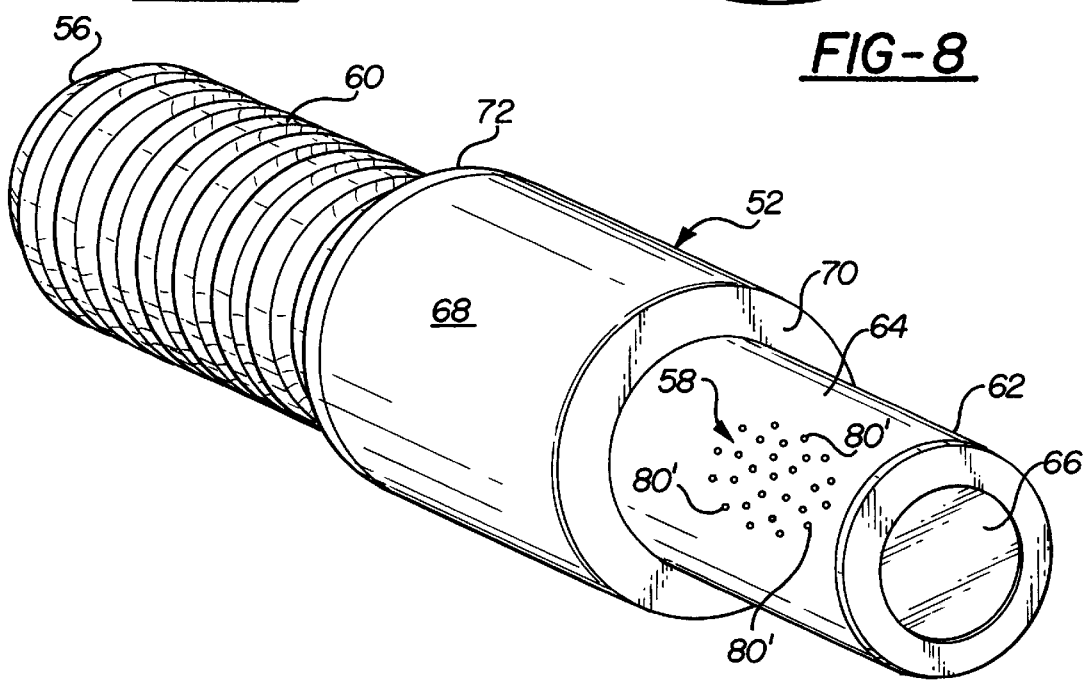
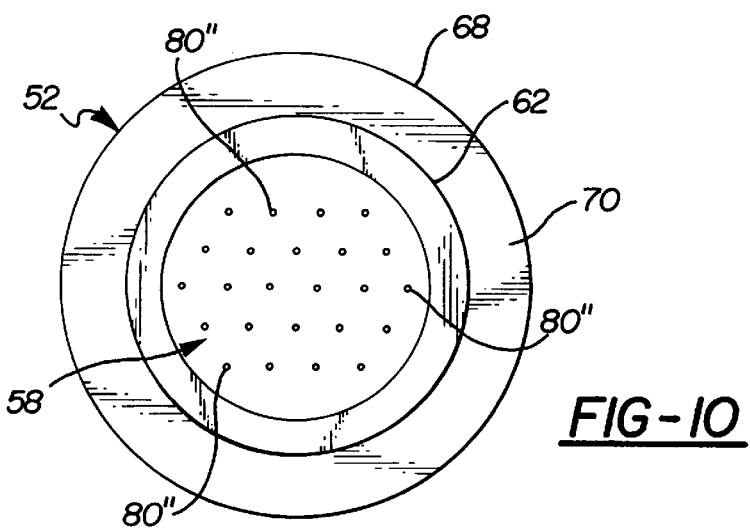
FIG-10

GAS NOZZLE FOR A GAS ASSISTED INJECTION MOLDING SYSTEM

BACKGROUND OF THE INVENTION

1. Technical Field

The present invention relates, generally, to a gas assisted injection molding system. More specifically, the invention relates to a gas nozzle employed in such systems.

2. Description of the Related Art

Gas assisted plastic injection molding is a well established and commercially accepted method for providing plastic articles having a hollow interior. These hollow, plastic articles have numerous advantages, such as high strength, low weight, reduced plastic material cost and improved article appearance due to less shrinkage stress. A detailed discussion of the development of gas assisted injection molding technology is contained in U.S. Pat. No. 5,110,533 and incorporated herein by reference.

In gas assisted injection molding, the articles are produced by injecting molten resin into the mold cavity and injecting a quantity of pressurized gas into the resin to fill out the mold cavity and form a hollow portion in the resin. The gas is preferably an inert gas such as nitrogen. The gas pressure is maintained in the mold cavity and against the resin until the plastic has cooled sufficiently to be self supporting. Thereafter, the gas is vented, the mold is opened and the plastic article is removed from the cavity. One example of a gas assisted molding apparatus is disclosed in my copending patent application having U.S. Ser. No. 08/522,596 filed on Sep. 1, 1995 and incorporated herein by reference.

Generally speaking, there are two points of entry for gas in an injection molding environment: (1) at the injection molding machine nozzle; and (2) in the mold.

When the gas is injected through the same nozzle employed for injecting the plastic into the mold, the gas pressure must be relatively high because the gas bubble will not penetrate the plastic until the gas pressure is greater than the plastic injection pressure. In addition, any restriction such as at the gate will impede the bubble penetration requiring higher initial gas pressures to move the plastic to fill out the mold. However, when the pressure is too high, and once the bubble breaks through the gate, the gas will rocket through the cavity which is at a lower pressure to the end of the plastic flow front. If this occurs, the gas may escape the envelope of the plastic material unless there is extra resin in the cavity to resist this high pressure. Such elevated initial gas pressures at the plastic injection nozzle may wash away most of the plastic that is adjacent the gate including the material at the nominal wall. Gas injection at the plastic nozzle also requires complicated resin shut-off devices, valves and sealing members which ultimately wear out and are generally expensive.

On the other hand, gas may be injected directly into the mold at either the mold cavity (in-article) or at some point along the runner (in-runner). Where gas is injected directly into the mold cavity, the initial gas pressure at the beginning of the gas filling phase of the process can be much lower than that employed at the resin injection nozzle. The lower gas pressure will tend to complete the polymer fill at a velocity that is closer to the initial polymer fill velocity, thereby avoiding a gloss variation between initial polymer fill and gas pressure fill. Gas nozzles located in the runner are advantageous where the design of the part or structure of the mold does not lend itself to the in-article approach.

Numerous gas nozzles have been proposed in the related art to take advantage of the design and engineering advantage of mold cavity and runner gas injection. For example, stationary gas nozzles have been employed in the related art because such nozzles generally involve a reduction or elimination of any moving parts. Such stationary nozzles are simple and cost effective. However, stationary nozzles suffer from the disadvantage that they often become clogged with resin during the injection process and must be cleaned on a regular basis.

In order to overcome this problem, gas nozzle designers have incorporated resin check valves to block the flow of molten resin into the gas nozzle. Unfortunately, these resin check valves increase the cost and complexity of such nozzles.

Another solution proposed in the related art involves a hollow gas nozzle with an interior solid pin that has been relieved on a portion of one side to allow for a gas passage through the nozzle. Unfortunately, problems still exist with such nozzles of the related art. More specifically, these gas nozzles are typically mounted from the back side of the mold which is fixedly mounted to the platen of an injection molding press. If the mold is overshot during the injection process, as can frequently be the case, excessive injection pressure can clog the nozzle with resin. In this case, the mold must be removed from the platen and the gas nozzle disassembled and cleaned. Further, gas may exit such nozzles only through the top or terminal end thereof which is a limiting factor in the design of the part and the mold. Finally, larger parts often require a larger volume of gas flow and the relieved area of the gas nozzle does not accommodate this larger volume.

Thus, there is a need in the art for a simple, cost effective, efficient, stationary gas nozzle which includes no moving parts and which will not clog with resin during polymer fill or gas venting even after repeated shots of the mold.

SUMMARY OF THE INVENTION

The present invention overcomes the disadvantages in the related art in a gas nozzle for a gas assisted injection molding system. More specifically, the gas nozzle of the present invention includes a body having an inlet in fluid communication with a source of pressurized gas, an outlet through which the gas leaves the nozzle and a passage extending between the inlet and the outlet. The outlet includes a plurality of apertures arranged in a predetermined manner relative to one another such that a line connecting at least three of the plurality of apertures approximates the sides of a right triangle. In the alternative, the outlet can include a plurality of apertures arranged in a predetermined radial manner about a common centerpoint on the outlet.

The plurality of apertures, while individually very small, provide a flow passage for the gas which approximates the flow path (but not volume) of gas through a ⅛ inch hole. And while the molten resin may form a "skin" over the outlet at the completion of a molding cycle, the individual apertures are sufficiently small such that they do not become clogged. Further, the "skin" covering the plurality of apertures is easily blown off during the next injection of gas for a subsequent part.

One advantage of the present invention is that a stationary gas pin for a gas assisted injection molding system is provided which includes no moving parts and does not require any expensive seals. Another advantage of the present invention is that the outlet for the gas does not become clogged with resin during successive molding processes. Still another advantage of the present invention is that the outlet for the gas is formed by a plurality of very small apertures arranged in a predetermined manner such that they approximate the flow path of a ⅛ inch hole. Still another advantage of the present invention is that the gas nozzle may be mounted in the cavity of the mold such that it is very accessible to the operator and may be easily removed, changed or cleaned.

Other features and advantages of the present invention will be readily appreciated as the same becomes better understood after reading the subsequent description when considered in connection with the accompanying drawings.

BRIEF DESCRIPTION OF THE DRAWINGS

FIG. 8 is an end view of the terminal end of the pin portion of the gas nozzle illustrating another alternate arrangement of the apertures of the outlet of the gas nozzle;

FIG. 9 is a perspective view of another embodiment of the gas nozzle of the present invention; and FIG. 10 is an end view of the terminal end of the pin portion of the gas nozzle illustrating one arrangement of the plurality of apertures of the outlet.

DESCRIPTION OF THE PREFERRED EMBODIMENT(S)

Figure 1:
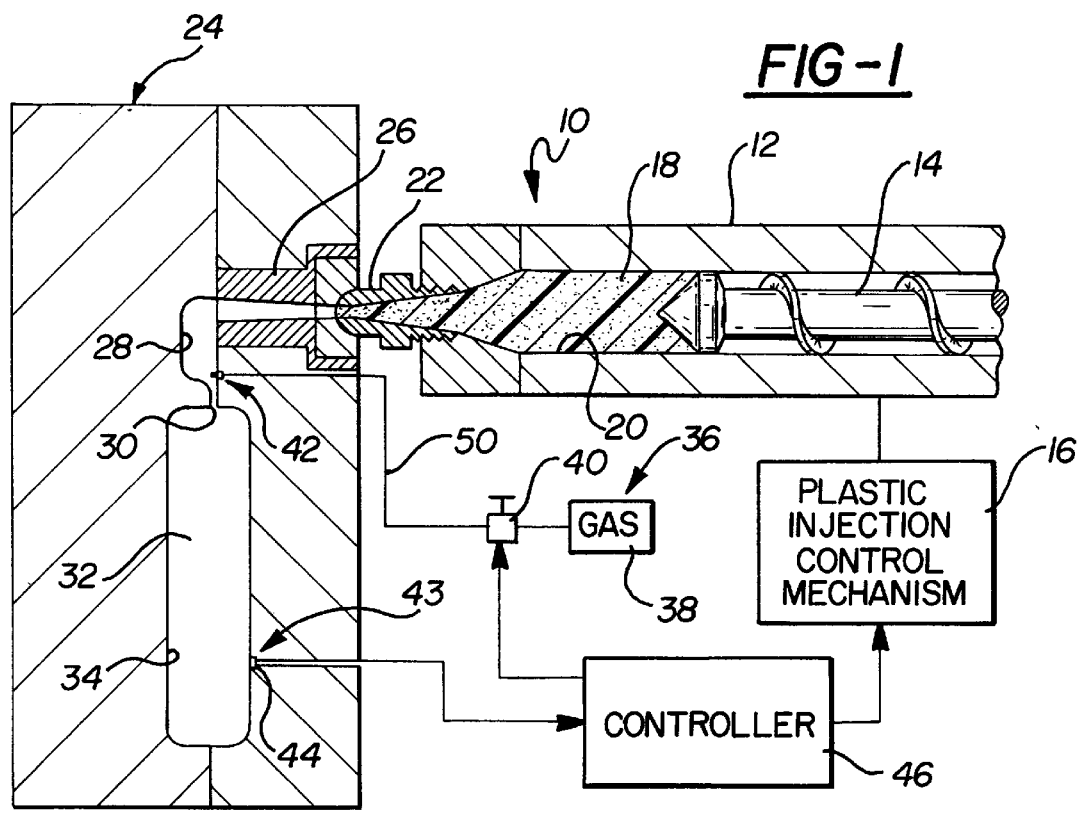
FIG. 1 is a schematic view of a plastic injection molding apparatus of the present invention wherein the plastic resin is shown just prior to injection into the mold and where the gas nozzle is located in the runner of the mold 24.
Figure 2:
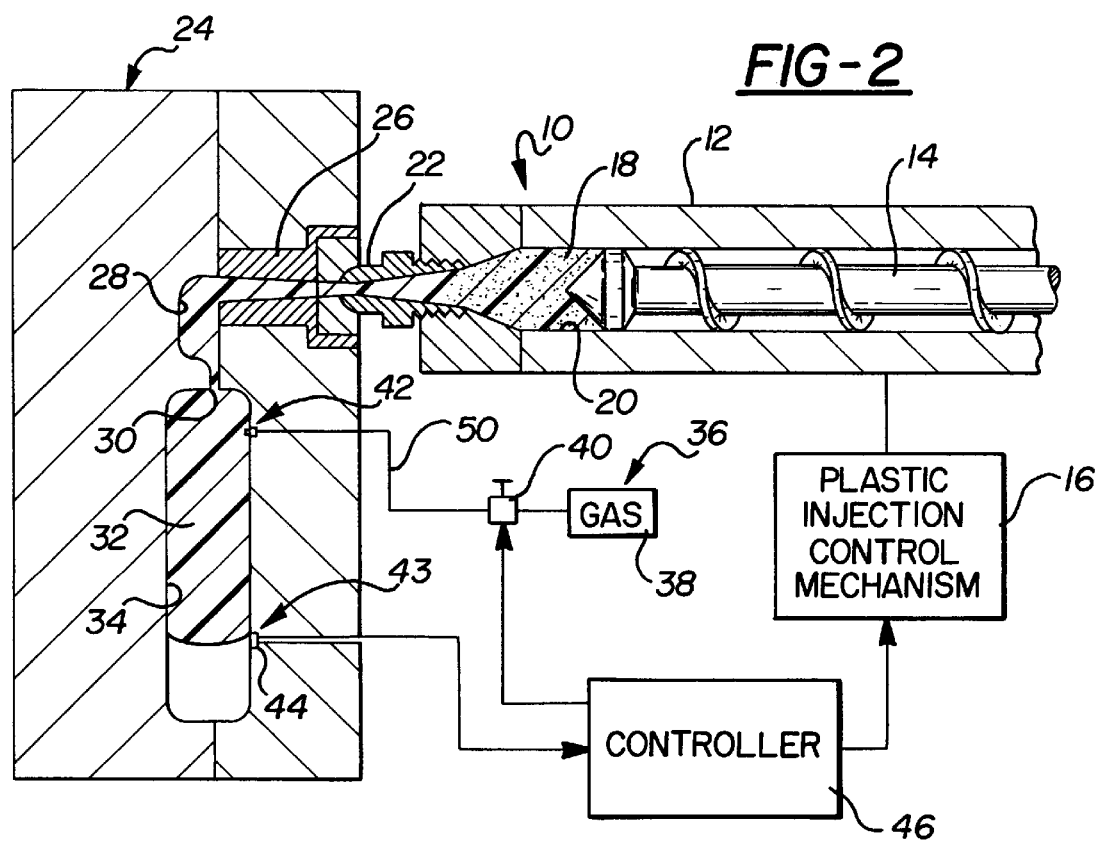
FIG. 2 is a schematic view of a plastic injection molding apparatus of the present invention wherein the plastic resin has partially filled the mold and the plastic injection is about to cease and where the gas nozzle is located in the mold cavity.
Figure 3:
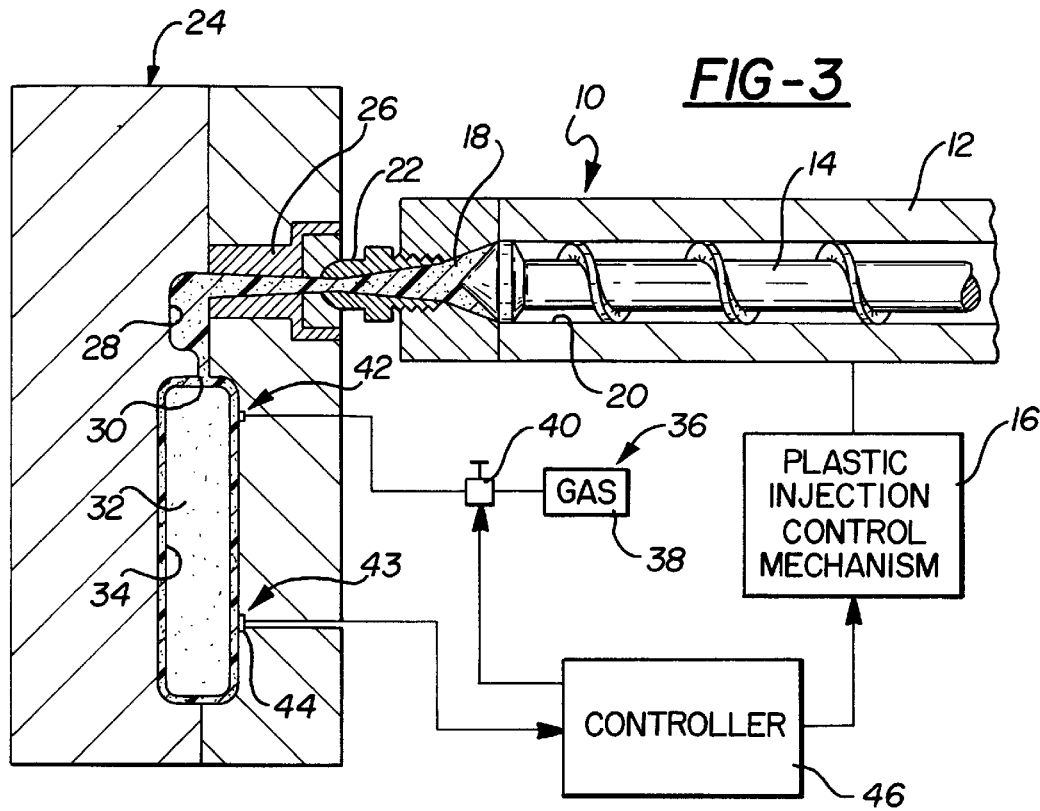
FIG. 3 is a schematic view of a plastic injection molding apparatus of the present invention wherein a plastic article in the cavity has been fully formed in response to plastic injection and the introduction of pressurized gas.

Referring now to the drawings, a gas assisted plastic injection molding apparatus is generally shown at 10 in FIGS. 1 through 3. The gas assisted plastic injection molding apparatus includes a plastic injector 12 which may have a screw-type ram 14 which is operatively controlled by a plastic injection control mechanisms 16. The plastic injection control mechanism 16 may comprise, for example, an electrical motor or hydraulic pump which drives the screw ram 14 and/or a gate valve to move molten resin 18 from a passage 20 in the injector 12 through an injector nozzle 22. Alternatively, the screw ram 14 may be replaced by any suitable means for forcing a shot of resin 18 from the injector 12 and into a mold, generally indicated at 24.

A sprue 26 is located between the injector nozzle 22 and a runner 28 in the mold 24. Similarly, a mold gate 30 is located between the runner 28 and the cavity 32 of the mold 24. The cavity 32 is defined by a cavity surface 34 which, in turn, defines the shape of the plastic article which is formed thereby.

A pressurized gas mechanism is generally indicated at 36 and includes a source of pressurized gas 38 and a pressure regulator 40. A gas nozzle, generally indicated at 42 in FIGS. 1 through 3, is employed to inject pressurized gas into the mold 24. More specifically, the gas nozzle 42 may be located in the runner 28 of the mold as shown in FIG. 1. Note here that the plastic resin 18 is shown just prior to injection into the mold. Alternatively, the gas nozzle 42 may also be located in the mold cavity 32 as shown in FIG. 2. As illustrated in this FIG., the plastic resin 18 has partially filled the mold cavity 32 and the plastic injection is about to cease. Further, and as shown in FIG. 3, a plastic article as defined by the cavity 32 of the mold 24 has been fully formed in response to the plastic injection and the introduction of pressurized gas through the gas nozzle 42 located in the cavity 32.

The plastic injection molding apparatus 10 further includes a flow front sensor control system, generally indicated at 43. This sensor control system 43 includes sensors 44 located at one or more predetermined locations at the cavity surface 34. A programmable data processing unit, or controller, 46 is employed to receive and store data from one or more of the sensors 44. The controller 46 also processes the data and thereupon selectively sends signals to the gas assisted plastic injection control mechanism 16 as well as the pressurized gas mechanism 36. These signals include a "stop injection" signal and a "start gas" signal. In this way, the gas assisted plastic injection molding apparatus 10 causes the plastic injection to start and stop and also causes the introduction of pressurized gas into the cavity to start and stop in response to those signals. The operation of the flow front sensor control system 43 is fully described in my previously identified copending patent application having U.S. Ser. No. 08/522,596.

Figure 4:
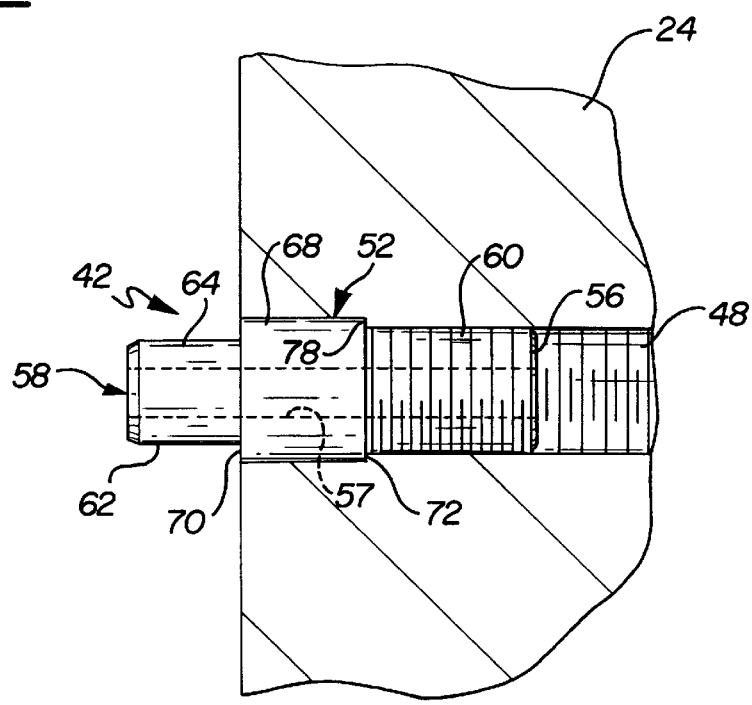
FIG. 4 is a cross-sectional side view of the gas nozzle of the present invention threadedly mounted to the mold.

Referring now to FIG. 4, the gas nozzle 42 is shown mounted to the mold 24. Depending on the preference of the designer, part geometry and other considerations, the nozzle 42 may be mounted so as to inject gas into the runner 28 as illustrated in FIG. 1 or into the mold cavity 32 as illustrated in FIGS. 2 and 3. In either case, the mold 24 will include a threaded port 48 which is drilled through the mold and tapped. The threaded port 48 is in fluid communication with the source of pressurized gas 38 through a conduit 50 or any other suitable means.

Figure 5:
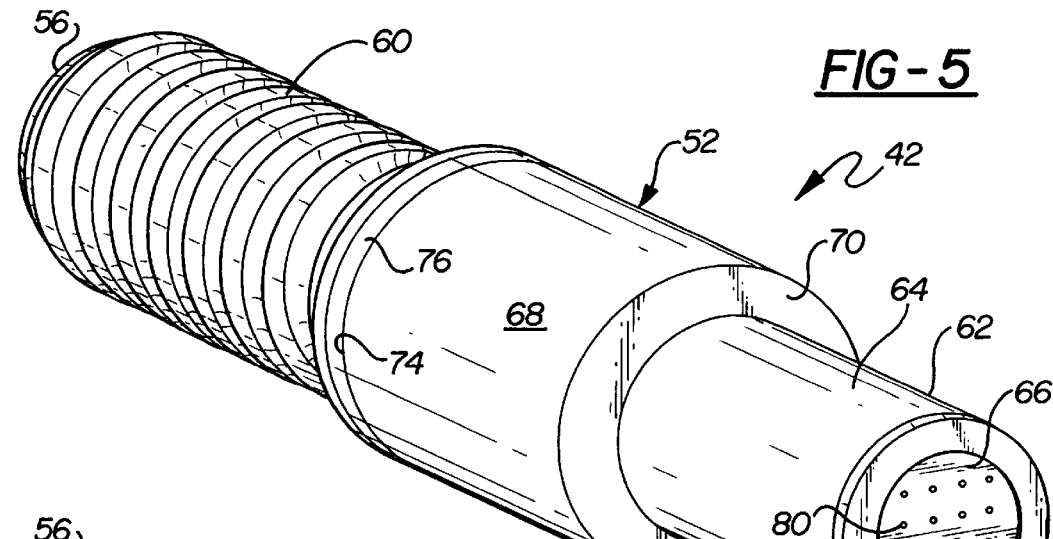
FIG. 5 is a perspective view of one embodiment of the gas nozzle of the present invention.
Figure 6:
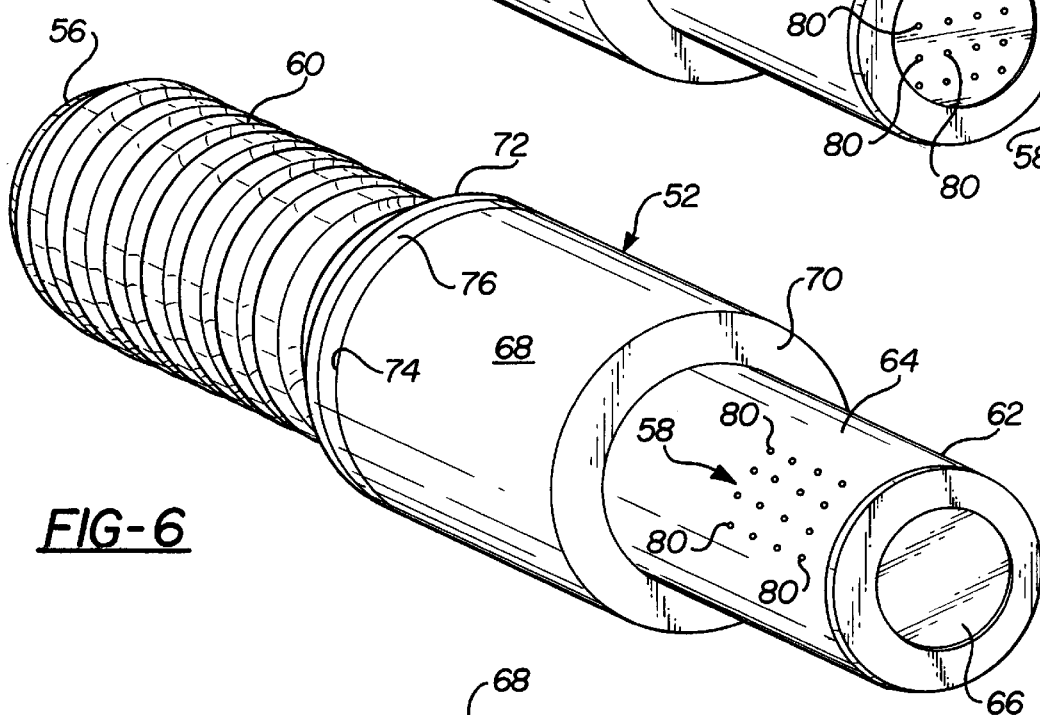
FIG. 6 is a perspective view of another embodiment of the gas nozzle of the present invention.

As best shown in FIGS. 4 through 6, the gas nozzle 42 is a unitary steel member including a body 52 having an inlet 56 in fluid communication with the source of pressurized gas 38. The gas nozzle 42 also includes an outlet, generally indicated at 58, through which the gas leaves the nozzle 42. In addition, the nozzle 42 includes a passage 57 which extends between the inlet 56 and the outlet 58. More specifically, the body 52 includes a threaded portion 60 which is threadedly received in the port 48 such that the gas nozzle 42 is mounted in fluid communication with the source of pressurized gas 38 from the runner 28 or cavity 32 side of the mold 24. In this way, the nozzle 42 may be quickly replaced or serviced without having to remove the mold 24 from the platen (not shown). The body 52 also includes a pin portion 62 which defines an outer surface 64 and a terminal end 66. As illustrated in the figures, the terminal end 66 may be recessed into the bore of the pin portion 62. The pin portion 62 is cylindrical in shape such that the outer surface 64 is arcuate. In addition, the body 52 includes a barrel portion 68 which is located between the threaded portion 60 and the pin portion 62 such that the threaded and pin portions 60, 62 extend from the barrel portion 68 on opposite sides thereof.

The barrel portion 68 is cylindrical in shape and defines a pair of annular shoulders 70, 72 located at either end of the cylindrical barrel portion 68. The barrel portion 68 also includes an annular groove 74 which is disposed between the pair of annular shoulders 70, 72. A sealing member 76 is received in the annular groove 74 of the barrel portion 68 for providing a seal between the body 52 and the port 48 in the mold structure 24. The sealing member 76 may be an annular neoprene gasket or any other suitable sealing member.

Typically, shoulders 70 of the barrel portion 68 will be disposed flush with the surface of the runner 28 or the cavity surface 34 in the mold 24. On the other hand, the body 52 is threaded into the port 48 until shoulder 72 comes into abutting contact with the stop surface 78 formed at a point in the port 48 where the diameter thereof changes to accommodate the barrel portion 68 which has a larger diameter than either the threaded portion 60 or the pin portion 62 of the body 52.

As shown in the FIGS., the pin portion 62 extends into either the runner 28 or the cavity 32 of the mold 24. In one embodiment shown in FIGS. 5 through 7, the outlet 58 includes a plurality of apertures 80 arranged in a predetermined manner relative to one another such that a line connecting at least three of the plurality of apertures 80 approximates the sides of a right triangle. Stated another way, the apertures 80 are arranged relative to one another such that the spacing between at least three apertures can be defined by the relationship $X^2+Y^2=Z^2$, where X is the distance between the first and second apertures, Y is the distance between the second and third aperture and Z forms the hypotenuse of the right triangle and is the distance between the first and third aperture. Furthermore, the apertures 80 are spaced from any adjacent aperture 80 in the outlet 58 in a range between 0.015 and 0.040 inches. The diameters of the apertures 80 may be in the range between 0.0025 and 0.006 inches.

Figure 7:
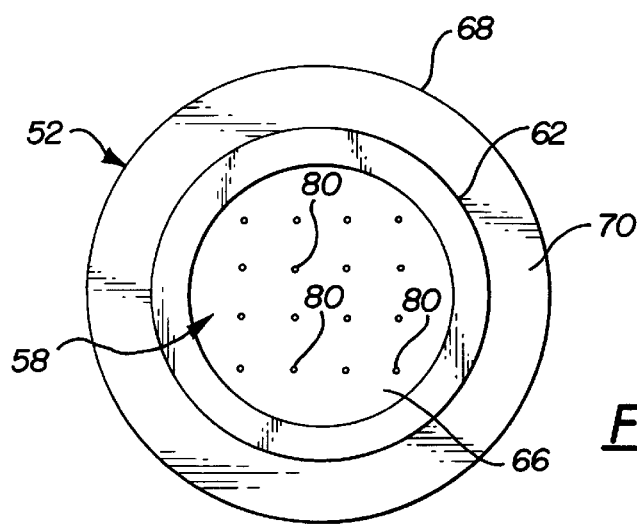
FIG. 7 is an end view of the terminal end of the pin portion of the gas nozzle illustrating one arrangement of the plurality of apertures of the outlet.

As shown in FIGS. 5 and 7, the outlet 58 may be located in the terminal end 66 of the pin portion 62. On the other hand, the outlet 58 may be located on the arcuate outer surface 64 of the pin portion 62. It will be appreciated that when the apertures 80 are located on the arcuate outer surface 64, the arrangement of the apertures 80 will only approximate a right triangle due to the curvature of this surface. It should also be noted that the outlet 58 may also be located on both the terminal end 66 and the outer surface 64 of the pin portion 62.

Another embodiment of the present invention is shown in FIGS. 8 and 9, wherein like numerals are used to indicate like parts. The outlet 58 may include a plurality of apertures 80' arranged in a predetermined radial manner about a common centerpoint on the outlet 58. More specifically, the plurality of apertures 80' are disposed in a prearranged series of concentric circles about a common centerpoint on either the terminal end 66 or on the arcuate outer surface 64 of the pin portion 62. As with the apertures 80, the apertures 80' of the outlet illustrated in FIGS. 8 and 9 are spaced from adjacent apertures 80' in a range between 0.015 and 0.040 inches. Furthermore, the diameter of the apertures 80' is in the range between 0.0025 and 0.006 inches.

Yet another embodiment of the present invention is shown in FIG. 10 wherein like numerals are used to indicate like parts. In this figure, the outlet 58 includes a plurality of apertures 80" arranged in a predetermined manner relative to one another such that a line connecting at least three of the plurality of apertures 80" approximates the size of an equilateral triangle. Stated another way, the apertures 80" are arranged relative to one another such that the spacing between at least three apertures can be defined by the relationship X=Y=Z, where X is the distance between the first and second apertures, Y is the distance between the second and third apertures and Z forms the third side of an equilateral triangle and is equal to the distance between the first and third apertures. As in the other embodiments, the apertures 80" are spaced from any adjacent aperture 80" in the outlet 58 in a range between 0.015 and 0.040 inches. The diameters of the apertures 80" may be in the range between 0.0025 and 0.006 inches.

The apertures 80, 80', 80" are cut into the steel of the pin portion 62 using a laser and are very small as noted above. Yet due, in part, to the number of apertures and the physical arrangement relative to one another, the gas flow through the outlet 58 approximates the flow through a ⅛ inch hole. This provides excellent flow characteristics for the gas nozzle 42 of the present invention without the problem of having the apertures 80, 80', 80" becoming clogged by molten resin. More specifically, while a skin of molten resin may form over the outlet 58 at the completion of a molding cycle, the individual apertures 80, 80' are sufficiently small such that they do not become clogged. The "skin" covering the plurality of apertures 80, 80', 80" is then easily blown off during the next injection of gas for a subsequent part.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A gas nozzle for a gas-assisted injection molding system, said gas nozzle comprising:

a body having an inlet in fluid communication with a source of pressurized gas, an outlet through which gas leaves said nozzle and a passage extending between said inlet and said outlet;

said outlet including a plurality of apertures arranged relative to one another such that a line connecting any three adjacent apertures of said plurality of apertures approximates the sides of a right triangle.

2. A gas nozzle as set forth in claim 1 wherein said body includes a threaded portion for mounting said body in fluid communication with a source of pressurized gas and a pin portion, said pin portion defining an outer surface and a terminal end.

3. A gas nozzle as set forth in claim 2 wherein said outlet is located in said terminal end of said pin portion.

4. A gas nozzle as set forth in claim 2 wherein said outlet is located in said outer surface of said pin portion.

5. A gas nozzle as set forth in claim 2 wherein said outlet is located in said terminal end and said outer surface of said pin portion.

6. A gas nozzle as set forth in claim 1 wherein each of said apertures is spaced from any adjacent aperture in said outlet in a range between 0.015 and 0.040 inches.

7. A gas nozzle as set forth in claim 1 wherein the diameter of said apertures is in the range between 0.0025 and 0.006 inches.

8. A gas nozzle for a gas assisted injection molding system, said gas nozzle comprising:

a body having an inlet in fluid communication with a source of pressurized gas, an outlet through which gas leaves said nozzle and a passage extending between said inlet and said outlet;

said outlet including a plurality of apertures arranged in a radial manner about a common centerpoint on said outlet such that said plurality of apertures forms a series of concentric circles.

9. A gas nozzle as set forth in claim 8 wherein said body includes a threaded portion for mounting said body in fluid communication with a source of pressurized gas and a pin portion, said pin portion defining an outer surface and a terminal end.

10. A gas nozzle as set forth in claim 9 wherein said outlet is located in said terminal end of said pin portion.

11. A gas nozzle as set forth in claim 9 wherein said outlet is located in said outer surface of said pin portion.

12. A gas nozzle as set forth in claim 9 wherein said outlet is located in said terminal end and said outer surface of said pin portion.

13. A gas nozzle as set forth in claim 8 wherein each of said apertures is spaced from any adjacent aperture in said outlet in a range between 0.015 and 0.040 inches.

14. A gas nozzle as set forth in claim 8 wherein the diameter of said apertures is in the range between 0.0025 and 0.006 inches.

15. A gas nozzle for a gas assisted injection molding system, said gas nozzle comprising:

a body having an inlet in fluid communication with a source of pressurized gas, an outlet through which gas leaves said nozzle and a passage extending between said inlet and said outlet;

said outlet including a plurality of apertures arranged relative to one another such that a line connecting any three adjacent apertures of said plurality of apertures approximates the sides of an equilateral triangle and wherein each of said apertures is spaced from any adjacent aperture in said outlet in a range between 0.015 and 0.040 inches.

16. A gas nozzle as set forth in claim 15 wherein said body includes a threaded portion for mounting said body in fluid communication with a source of pressurized gas and a pin portion, said pin portion defining an outer surface and a terminal end.

17. A gas nozzle as set forth in claim 16 wherein said outlet is located in said terminal end of said pin portion.

18. A gas nozzle as set forth in claim 16 wherein said outlet is located in said outer surface of said pin portion.

19. A gas nozzle as set forth in claim 16 wherein said outlet is located in said terminal end and said outer surface of said pin portion.

20. A gas nozzle as set forth in claim 15 wherein the diameter of said apertures is in the range between 0.0025 and 0.006 inches.

21. A gas assisted plastic injection molding apparatus comprising:

a plastic injector having a nozzle and a flow passage from which molten plastic flows into a mold cavity;

a source of pressurized gas and a controller for selectively starting and stopping the injection of molten plastic and pressurized gas into a mold cavity;

a gas nozzle including a body having an inlet in fluid communication with a source of pressurized gas, an outlet through which gas leaves said nozzle and a passage extending between said inlet and said outlet;

said outlet including a plurality of apertures arranged relative to one another such that a line connecting any three adjacent apertures of said plurality of apertures approximates the sides of a right triangle.

22. An apparatus as set forth in claim 21 wherein said body includes a threaded portion for mounting said body in fluid communication with a source of pressurized gas and a pin portion, said pin portion defining an outer surface and a terminal end.

23. An apparatus as set forth in claim 22 wherein said outlet is located in said terminal end of said pin portion.

24. An apparatus as set forth in claim 22 wherein said outlet is located in said outer surface of said pin portion.

25. An apparatus as set forth in claim 22 wherein said outlet is located in said terminal end and said outer surface of said pin portion.

26. An apparatus as set forth in claim 21 wherein each of said apertures is spaced from any adjacent aperture in said outlet in the range between 0.015 and 0.040 inches.

27. An apparatus as set forth in claim 21 wherein the diameter of said apertures is in the range between 0.0025 and 0.006 inches.

28. A gas assisted plastic injection molding apparatus comprising:

a plastic injector having a nozzle and a flow passage from which molten plastic flows into a mold cavity;

a source of pressurized gas and a controller for selectively starting and stopping the injection of molten plastic and pressurized gas into a mold cavity;

a gas nozzle including a body having an inlet in fluid communication with a source of pressurized gas, an outlet through which gas leaves said nozzle and a passage extending between said inlet and said outlet;

said outlet including a plurality of apertures arranged in a radial manner about a common centerpoint on said outlet such that said plurality of apertures forms a series of concentric circles.

29. An apparatus as set forth in claim 28 wherein said body includes a threaded portion for mounting said body in fluid communication with a source of pressurized gas and a pin portion, said pin portion defining an outer surface and a terminal end.

30. An apparatus as set forth in claim 29 wherein said outlet is located in said terminal end of said pin portion.

31. An apparatus as set forth in claim 29 wherein said outlet is located in said outer surface of said pin portion.

32. An apparatus as set forth in claim 29 wherein said outlet is located in said terminal end and said outer surface of said pin portion.

33. An apparatus as set forth in claim 28 wherein each of said apertures is spaced from any adjacent aperture in said outlet in a range between 0.015 and 0.040 inches.

34. An apparatus as set forth in claim 28 wherein the diameter of said apertures is in the range between 0.0025 and 0.006 inches.

35. A gas assisted plastic injection molding apparatus comprising:

a plastic injector having a nozzle and a flow passage from which molten plastic flows into a mold cavity;

a source of pressurized gas and a controller for selectively starting and stopping the injection of molten plastic and pressurized gas into a mold cavity;

a gas nozzle including a body having an inlet in fluid communication with a source of pressurized gas, an outlet through which gas leaves said nozzle and a passage extending between said inlet and said outlet;

said outlet including a plurality of apertures arranged relative to one another such that a line connecting any three adjacent apertures of said plurality of apertures approximates the sides of an equilateral triangle and wherein each of said apertures is spaced from any adjacent aperture in said outlet in the range between 0.015 and 0.040 inches.

36. An apparatus as set forth in claim 35 wherein said body includes a threaded portion for mounting said body in fluid communication with a source of pressurized gas and a pin portion, said pin portion defining an outer surface and a terminal end.

37. An apparatus as set forth in claim 36 wherein said outlet is located in said terminal end of said pin portion.

38. An apparatus as set forth in claim 36 wherein said outlet is located in said outer surface of said pin portion.

39. An apparatus as set forth in claim 36 wherein said outlet is located in said terminal end and said outer surface of said pin portion.

40. An apparatus as set forth in claim 35 wherein the diameter of said apertures is in the range between 0.0025 and 0.006 inches.

* * * * *